United States Patent
Trionfetti

(10) Patent No.: US 12,208,485 B2
(45) Date of Patent: Jan. 28, 2025

(54) BALANCING DEVICE FOR ROTATING PIECES

(71) Applicant: BALANCE SYSTEMS S.r.L., Milan (IT)

(72) Inventor: Gianni Trionfetti, Agrate Brianza (IT)

(73) Assignee: BALANCE SYSTEMS S.R.L., Milan (IT)

( * ) Notice: Subject to any disclaimer, the term of this patent is extended or adjusted under 35 U.S.C. 154(b) by 819 days.

(21) Appl. No.: 17/336,867

(22) Filed: Jun. 2, 2021

(65) Prior Publication Data

US 2021/0379728 A1    Dec. 9, 2021

(30) Foreign Application Priority Data

Jun. 3, 2020   (IT) ................. 102020000013102
Jun. 30, 2020  (IT) ................. 102020000015742
Dec. 21, 2020  (IT) ................. 102020000031709

(51) Int. Cl.
  *B24B 41/04*  (2006.01)
  *B23Q 11/00*  (2006.01)
  *G01M 1/36*   (2006.01)

(52) U.S. Cl.
  CPC ........ *B24B 41/042* (2013.01); *B23Q 11/0035* (2013.01); *G01M 1/36* (2013.01); *Y10T 74/2127* (2015.01)

(58) Field of Classification Search
  CPC .... B24B 41/042; B23Q 11/0035; G01M 1/36; Y10T 74/2127
  See application file for complete search history.

(56) References Cited

U.S. PATENT DOCUMENTS 5,676,025 A * 10/1997 Lulay ............. F16F 15/36
                                              73/470
5,741,172 A *  4/1998 Trionfetti ........ B24B 49/18
                                              451/21
(Continued)

FOREIGN PATENT DOCUMENTS

DE       10116869 A1   10/2001
DE    102007028728 A1   12/2008
(Continued)

OTHER PUBLICATIONS

The Italian Search Report issued for corresponding Italian Patent Application No. 202000013102, completed on Dec. 2, 2020, seven pages.

(Continued)

*Primary Examiner* — Thomas C Diaz
(74) *Attorney, Agent, or Firm* — Vorys, Sater, Seymour and Pease LLP

(57) ABSTRACT

A balancing device for each rotating piece, the rotating piece defining an axis of rotation, the balancing device including: a fixed portion, a mobile portion defining a central axis. The balancing device constrained to the rotating piece so that the central axis substantially coincides with the rotation axis. The balancing device including at least one eccentric mass, rotatable around the central axis and not balanced with respect to the central axis. The balancing device further including apparatus for movement of the eccentric masses, including a magnetic brake and being able to rotate the eccentric masses, with respect to the rotating piece around the central axis.

15 Claims, 3 Drawing Sheets

(56) References Cited

U.S. PATENT DOCUMENTS

| | | | | |
|---|---|---|---|---|
| 8,281,686 B2* | 10/2012 | Chen | ............... | G01M 1/36 74/572.4 |
| 2003/0089193 A1* | 5/2003 | Altieri | ............... | G01M 1/36 74/571.1 |
| 2006/0005623 A1 | 1/2006 | Hildebrand et al. | | |

FOREIGN PATENT DOCUMENTS

| | | | | |
|---|---|---|---|---|
| EP | 2717032 A1 | 4/2014 | | |
| EP | 2769805 A1 | 8/2014 | | |
| EP | 3534135 A1 | 9/2019 | | |
| WO | WO-2008154983 A1 * | 12/2008 | ............... | F16F 15/02 |

OTHER PUBLICATIONS

The Italian Search Report issued for corresponding Italian Patent Application No. 202000015742, completed on Mar. 9, 2021, eight pages.
Machine translation of WO2008154983, URL:<https://patentscope.wipo.int/search/en/detail.jsf?docId=WO2008154983&_cid=P11-LXDQIR-32005-1> and URL:<https://patentscope.wipo.int/search/en/detail.jsf?docId=WO2008154983&_cid=P11-LXDQU4-37579-1>, retrieved from the Internet Jun. 13, 2024.

* cited by examiner sec. B-B

BALANCING DEVICE FOR ROTATING PIECES

The present invention relates to a balancing device for rotating pieces of the type specified in the preamble of the first claim.

Various types of balancing devices for rotating pieces are currently known. In particular, on board rotating devices, such as machine tools or other machinery, there are balancing devices capable of constantly maintaining the centre of mass of the rotating portion in the selected position. Generally, the said centre of mass of the rotating portion is maintained in correspondence with the rotation axis, so that unwanted centrifugal forces are not created.

Said balancing devices are generally inserted in balancing apparatuses which also comprise unbalance measuring means, capable of verifying and measuring the presence of an unbalance.

The unbalance is consequently regulated and cancelled, or reduced to the maximum, by the said balancing device, constrained to the rotating portion.

The latter comprises two unbalanced masses, with respect to the rotation axis of the rotating piece, and therefore each comprising an appropriately identical imbalance, or rather of the same mass. The balancing device also comprises two motors, one for each mass, capable of rotating said masses around the rotation axis itself.

The position of the unbalanced masses affects the centre of mass of the rotating portion.

In fact, if the same masses are opposite, staggered at 180° with respect to the rotation axis, their imbalances cancel each other out and the balancing device does not change the position of the centre of mass of the assembly consisting of the rotating portion and the balancing device.

On the contrary, if the masses are not opposite, their imbalances do not cancel each other out and the balancing device generates an imbalance. Said unbalance at the same time is suitably made equal to and opposite to the unbalance of the rotating portion, so that the position of the centre of mass of the assembly consisting of the rotating portion and the balancing device is modified and is positioned along the rotation axis or as close to it as possible.

The said masses are generally moved, with respect to the rotating piece and to modify the portion of the centre of mass, by means of electric motors and mechanical connections. As described for example in patent application EP-A-2717032 by the same applicant.

Patent application US-A-17886005, on the other hand, shows masses moved directly from the fixed portion.

Patent application EP-A-19158944, by the same applicant, shows balancing masses moved by motors inside the masses themselves.

Patent application EP-A-13156332, by the same applicant, shows moving balancing masses consisting of wires or tapes that can be wound around reels placed in eccentric positions with respect to the rotation axis, so that the winding and unwinding around different reels result in a transfer of mass and a change in the centre of mass of the balancing device.

The known technique described includes some drawbacks.

In particular, said devices are very complex and therefore could be subject to problems if not constantly revised.

They are also very subject to wear.

A further drawback is that it is not possible to miniaturize very complex systems. This drawback is particularly relevant for grinding wheels for internal grinding, or rather grinding wheels for cavities of machining pieces. These wheels are very small and cannot support a balancing system.

The complexity and problems are further accentuated by the considerable forces at play. In fact, said rotating pieces can reach speeds of the order of magnitude of tens of thousands of revolutions per minute.

In this situation, the technical task underlying the present invention is to devise a balancing device capable of substantially obviating at least part of the aforementioned drawbacks.

Within the scope of said technical task, it is an important object of the invention to obtain a balancing device which is simple and robust.

Another important object of the invention is to provide a balancing device which is precise.

Another important object of the invention is to provide a wheel balancing device for cavities of machining pieces.

Not least object of the invention is to provide an inexpensive balancing device.

The technical task and the specified aims are achieved by a balancing device as claimed in the annexed claim 1.

Preferred technical solutions are highlighted in the dependent claims.

The characteristics and advantages of the invention are clarified below by the detailed description of preferred embodiments of the invention, with reference to the accompanying figures, in which:

FIG. 3a shows a third example, in schematic side view of the balancing device according to the invention; to FIG. 3b is the section B-B indicated in FIG. 3a.

Figure 1:
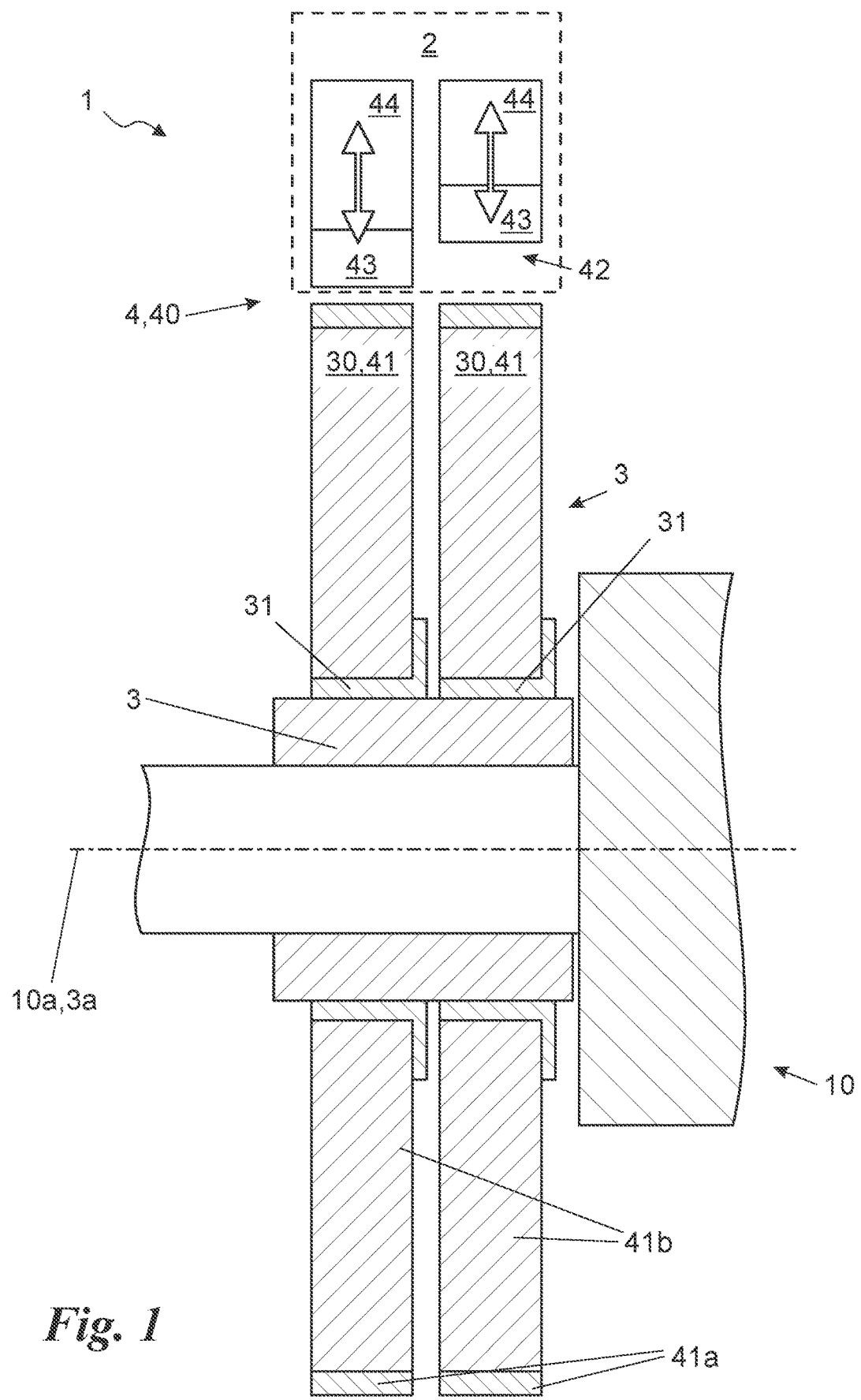
FIG. 1 shows a diagram of the balancing device according to the invention.

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

The measurements and data reported in this text are to be considered, unless otherwise indicated, as performed in the International Standard Atmosphere ICAO (ISO 2533:1975).

With reference to the Figures, the balancing device according to the invention is globally indicated with the number 1.

It is conveniently part of a balancing apparatus, described below, comprising a rotating piece 10. Said rotating piece 10 is preferably constituted by the rotor of a machine tool, for example a grinding wheel or similar, or by other devices and defines an axis of rotation 10a.

In an important variant of the invention, the rotating piece 10 is a tool, in particular a grinding wheel, for machining, in particular grinding, internal cavities of pieces. The said wheels, to reach an optimal cutting speed (=/> at 30 m/s) must work at tens of thousands of revolutions. At such high rotational speeds, even very small unbalances generate vibrations which in turn penalize the machining quality and also the duration of the spindle itself. Furthermore, also the wheel-holder shaft, in some cases, is very long and therefore very sensitive to the unbalance of the wheel. The balancing device 1 comprises a fixed portion 2, preferably fixed for example with respect to the ground, and a mobile portion 3, preferably rotatable and defining a central axis 3a.

The movable portion 3 is preferably constrainable integrally to the rotating piece 10 so that the central axis 3a substantially coincides with said axis of rotation 10a.

The balancing device 1 has the purpose of eliminating the imbalances of the system comprising the movable portion 3 of the balancing device 1 and the rotating piece 10. Such imbalances are eliminated when the centre of mass of the system movable portion 3 and the rotating piece 10 lies along the axis of rotation 10a.

The mobile portion 3 preferably comprises at least one eccentric mass 30 rotatable around the central axis 3a, and more preferably two eccentric masses 30, which are not balanced with respect to the central axis 3a. Each eccentric mass 30 is preferably rotatable, independently of the other mass and of the rest of the mobile portion 3 around the central axis 3a.

The eccentric masses 3 are for example constituted by two annular elements, with axis along the central axis 3a, having asymmetrically discharged portions or similar.

The balancing device 1 also preferably comprises means for moving 4 the individual eccentric masses 30, adapted to rotate around the central axis 3a and the individual eccentric masses 30, with respect to the other eccentric masses 30 and to the remaining part of the mobile portion 3, integral with the rotating piece 10.

The movement means 4 preferably comprise a magnetic brake 40.

As known, magnetic brakes, used for high-speed trains and similar, therefore in fields of the art completely different from the present, use the phenomenon of eddy currents.

Eddy currents are currents induced in a conductor that is immersed in a variable magnetic field. Said variation can be caused by the reciprocal movement between the magnetic field and the said conductor. The variable magnetic field generates the circulation of electrons in the conductor, in accordance with Faraday's law. These electrons, therefore this moving electric current, in turn generate a magnetic field in the opposite direction to the variation of the applied magnetic field which opposes said reciprocal movement between the magnetic field and the conductor. This opposition is the driving force behind how magnetic brakes work.

The magnetic brake 40 preferably comprises at least one conductive portion 41, made of conductive material, and at least one magnetic portion 42 capable of creating a magnetic field acting on the conductive portion 41.

One of the two portions 41 and 42, and preferably the conductive portion 41 it is preferably integral with the eccentric mass 30 and, more preferably still the conductive portion 41 coincides with the eccentric mass 30, for example the eccentric mass is made of metal with high conductivity such as a metal material mainly including aluminium or copper.

In a preferred example, the conductive portion 41 coinciding with the eccentric mass 30 comprises a peripheral portion 41a and a central portion 41b.

The peripheral portion 41a defines the peripheral ring of the eccentric mass 30 and is preferably made of copper or aluminium or a non-ferromagnetic and high conductivity material, it also preferably has a thickness, in the radial direction, less than one cm, more preferably less to 5 mm, more preferably still between 1 mm and 5 mm. Furthermore, preferably, the peripheral portion has a thickness comprised between 0.5% and 5%, more preferably between 1% and 3%, of the diameter of the eccentric mass 3.

The central portion 41b preferably adjoins the portion peripheral 41a towards the inside of the mass 30 and has a greater thickness. Preferably, the thickness of the central portion 41b, in the radial direction, is greater than 5 mm, more preferably between 5 mm and 2 cm, more preferably between 8 mm and 15 mm. Furthermore, preferably, the peripheral portion has a thickness comprised between 5% and 20%, more preferably between 10% and 15%, of the diameter of the eccentric mass 3.

The ratio between the length, in the radial direction, of the central portion 41b and peripheral portion 41a is furthermore preferably comprised between 3 and 50, preferably between 5 and 25, more preferably between 6 and 20.

It is preferably made of ferromagnetic material, more preferably of ferromagnetic steel or iron or similar. These materials, shapes and dimensions surprisingly maximize the efficiency of the device 1, maximizing the effect of the magnetic brake.

Preferably, the other of the portions 41 and 42, and more preferably the magnetic portion 42, is fixed with respect to the rotation of the piece 50. More preferably, there are two magnetic portions 42, one for each mass, or only one movable in the direction of the central axis 3a.

The magnetic portion 42 comprises, in a first preferred example, a permanent magnet 43, for example neodymium, and adjustment means 44 the distance between the permanent magnet 43 and the conductive portion 41.

The adjustment means 44 can define a lying trajectory, at least in part in the radial direction with respect to the central axis 3a. The adjustment means 44 may further comprise an electric motor or similar.

In a second preferred example, not shown in the figures, the magnetic portion 42 comprises an electromagnet, preferably of annular shape or annular sector and arranged around said eccentric masses.

Figure 2:
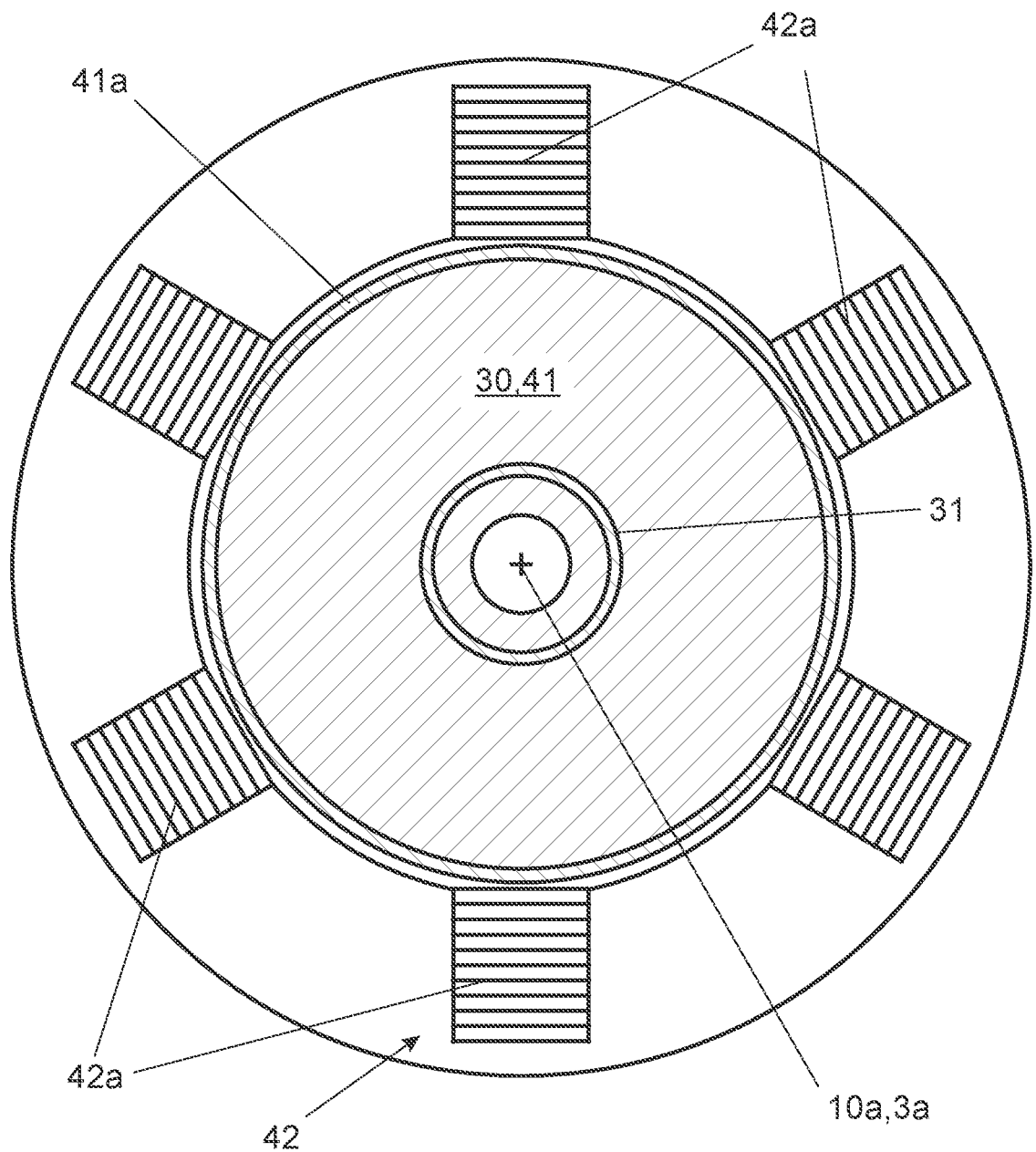
FIG. 2 shows a second diagram of a transversal section of the balancing device according to the invention.

In a third example (FIG. 2), the magnetic portion 42 comprises an electromagnet 42a made from at least one coil having a radial axis with respect to the central axis 3a. In this case the adjustment means 44 may or may not be present, more preferably they are not and the electromagnets are fixed. More preferably, the said coils are more than one, preferably between two and eight, more preferably four. They are preferably arranged at constant circumferential intervals around the axis 3a.

Figure 3A:
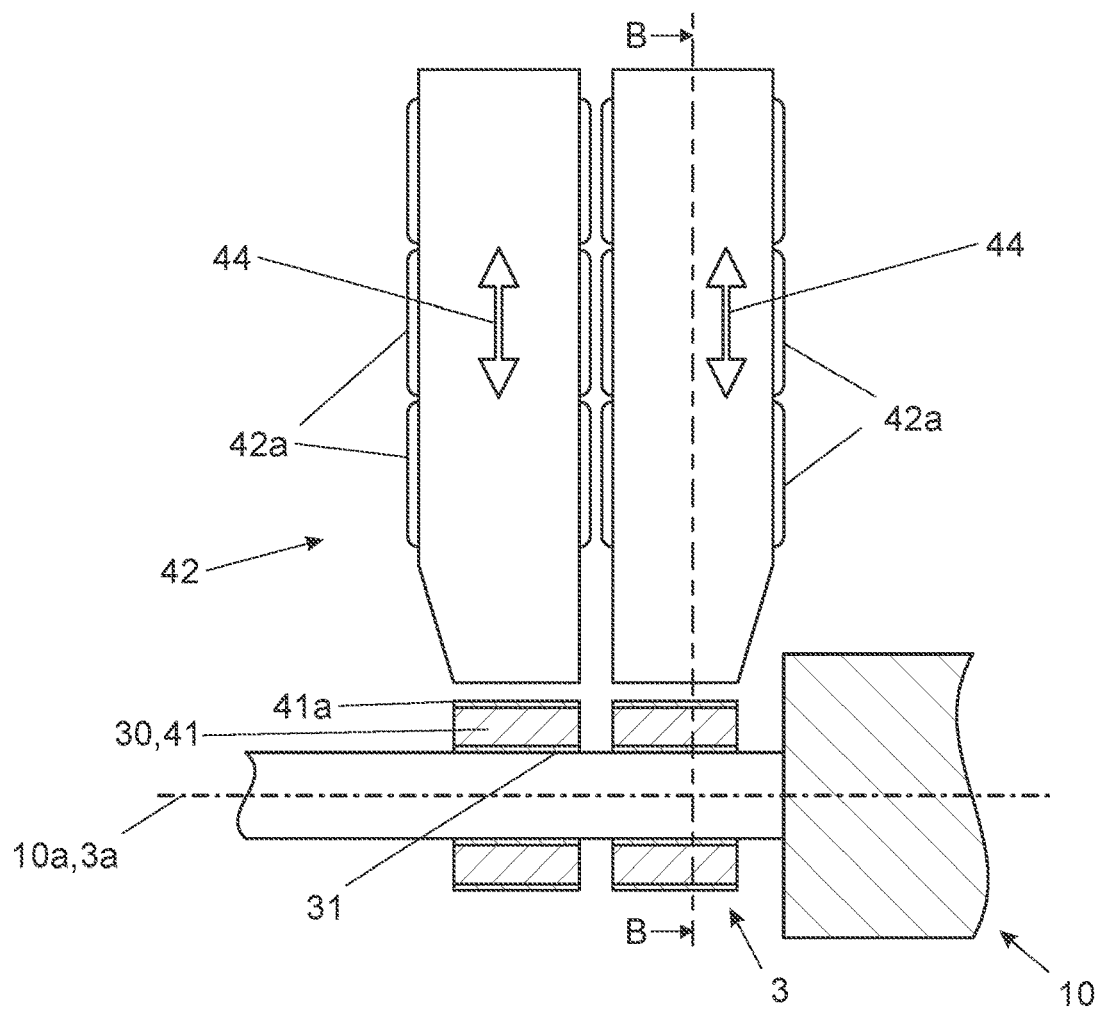
Figure 3B:
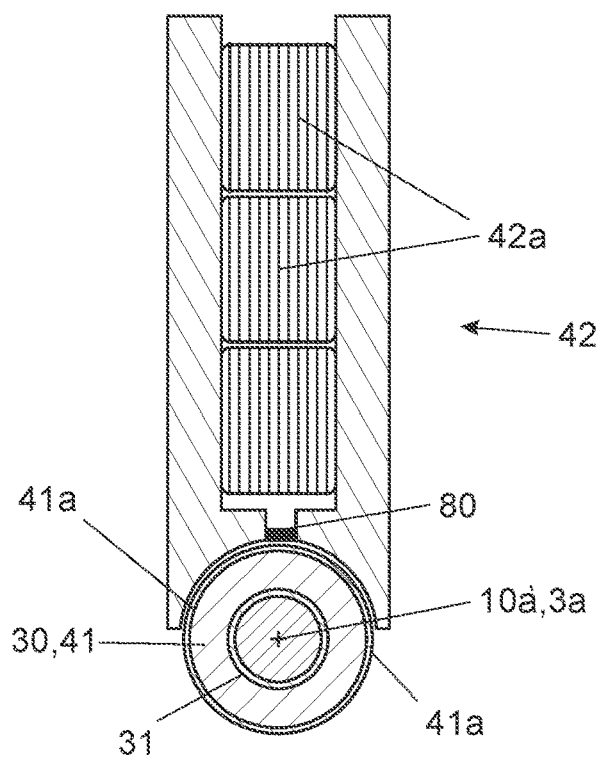

In a fourth example (FIGS. 3a, 3b), used in particular for grinding wheels for internal cavities of pieces, the magnetic portion 42 comprises at least one electromagnet 42a, similar to the electromagnets of the third example, and distance adjustment means 44 between the electromagnet and the conductive portion 41. In this case, the adjustment means 44 have the sole purpose of allowing the electromagnets 42a to approach the eccentric masses and to adjust the latter, or to move the electromagnets 42a away from the eccentric masses for leave the area free and allow movement, in particular axial, of the latter. In this example, the final part of the magnetic portion 42 is preferably counter-shaped to the masses 30. Furthermore, a hall sensor, a magnet 80 or similar means for verifying the positioning of the masses themselves can be positioned in this position.

To allow the movement by means of the magnetic brake 40, the eccentric masses 30 are preferably constrained to the remaining part of the movable portion 3, or directly to the rotating part 10, by means of a non-zero friction rotational bearing 31, such as a polymeric bearing or similar. This bearing 31 constrains the masses 30 with sufficient resistance to the remaining part of the mobile portion 3 to support the rotational accelerations of the rotating piece 10, and, at the same time, allows the magnetic brake 40 to move, braking it, the eccentric mass 30 with respect to the remaining part of the mobile portion 3.

Inside the device 1 there are preferably sensors for detecting the angular position of each eccentric mass 30, in order to facilitate the balancing procedure.

The balancing apparatus comprising the said balancing device 1 and, preferably detecting means for the imbalance, such as accelerometers known per se that can be inserted in the device 1 or not, a synchronism sensor for detecting the rotation of the axis 10a, electrical power supply means, connected to the aforementioned electric motors or electromagnets, control means, capable of receiving the information, transmitting it and controlling the movement means 4 and the other elements. The balancing apparatus may further comprise sensor means suitable for sensing the contact between the rotating piece 10 and the machining piece, in particular when the former is constituted by a grinding wheel or similar tool.

The operation of the balancing device 1, and of the balancing apparatus, previously described in structural terms, is as follows.

It defines a new process for moving an eccentric mass 30, around a central axis 3a, to modify the centre of mass of a rotating piece 10. In this process, the eccentric mass 30 is preferably moved by means of magnetic braking, preferably operated by movement means 4 preferably comprising a magnetic brake 40 of the type preferably previously described.

The process takes place preferably by means of the balancing device 1 previously described and, preferably by means of the balancing apparatus previously described.

In detail, the movable portion 3 of the balancing device 1 is rigidly constrained to a shaft of the rotating piece 10, so that the central axis 3a substantially coincides with the rotation axis 10a.

Initially, if the rotating piece is balanced, the two eccentric masses 30 are offset by 180°, so that the balancing device 1 is also balanced and also the whole of the two objects.

If an imbalance occurs in the rotating piece 10, the unbalance detection means perceives it, measures it and sends it to the control means.

These control the movement means 4 which increase the magnetic field in correspondence with the eccentric masses 30.

In particular, a permanent magnet 43 is brought near, by means of the adjustment means 44, to the conductive portion 41 constituted by the eccentric mass 30. Alternatively, or in addition, the electromagnet creates a more or less strong magnetic field in the vicinity of the eccentric mass 30.

The eddy currents created by the magnetic field formed by the permanent magnet 43, create a current movement along the eccentric mass 30 which opposes the reciprocal movement between permanent magnet 43 and eccentric mass 30. Since the latter is in rotational movement around the axis 10a, the latter is braked and varies angular position with respect to the rest of the mobile portion 3, thanks to its rotary drive around the bearing 31.

The eccentric masses 30 are then rotated until the unbalance of the balancing device 1 is equal and opposite to the unbalance of piece 10, in such a way as to balance it.

If the magnetic field is reduced, for example by moving the permanent magnet 43 away from the eccentric mass 30 or by decreasing the magnetic field of the electromagnet, the eddy currents decrease their intensity and the magnetic field decreases its strength. The eccentric mass 30 then returns to be integral with the remaining part of the mobile portion 3 and with the rotating piece 10.

The balancing device 1 according to the invention achieves important advantages. In fact, the balancing device is simple and robust, not including complex rotational motors and similar. It can therefore also be placed on board rotating elements that exceed tens of thousands of revolutions per minute.

For the same reasons it is very economical.

Furthermore, the balancing device 1 according to the invention can be applied to tools, in particular to grinding wheels, to machine, in particular to grind, internal cavities of pieces, in particular due to the very small dimensions required.

The invention is susceptible of variants falling within the scope of the inventive concept defined by the claims. In this context, all the details can be replaced by equivalent elements and the materials, shapes and dimensions can be any.

The invention claimed is:

1. A balancing device for a rotating piece,
said rotating piece defining an axis of rotation,
said balancing device comprising:
    a fixed portion,
    a movable portion defining a central axis, said movable portion
        being constrained to said rotating piece so that said central axis substantially coincides with said rotation axis, and
        comprising at least one eccentric mass rotatable around said central axis and not balanced with respect to said central axis,
    movement means of said at least one eccentric mass, suitable to rotate said eccentric mass, with respect to said rotating piece around said central axis,
    wherein said movement means comprise exclusively a magnetic brake, and
    said eccentric mass comprises a peripheral portion, in non-ferromagnetic material with high conductivity, and a central portion, in ferromagnetic material.

2. The balancing device according to claim 1, wherein said magnetic brake comprises at least a conductive portion, made of conductive material, and at least one magnetic portion suitable for creating a magnetic field acting on said eccentric mass.

3. The balancing device according to claim 2, wherein said conductive portion is integral with said eccentric mass and said magnetic portion is fixed with respect to rotation around said axis of rotation.

4. The balancing device according to claim 3, wherein said conductive portion coincides with said eccentric mass.

5. The balancing device according to claim 2, wherein said magnetic portion comprises at least one electromagnet.

6. The balancing device according to claim 5, wherein said electromagnet has the axis in a radial direction with respect to said central axis.

7. The balancing device according to claim 5, wherein there are a plurality of said electromagnets fixed with respect to said radial direction.

8. The balancing device according to claim 1, wherein the ratio between the length, in radial direction, of said central portion and of said peripheral portion is between 3 and 50.

9. A machine tool comprising a balancing device according to claim 1.

10. The machine tool according to claim 9, consisting of a machine tool for machining of internal cavities of pieces.

11. The machine tool according to claim 10, consisting of a grinding wheel.

12. The machine tool according to claim 10, further comprising a grinding wheel.

13. A balancing device for a rotating piece,
said rotating piece defining an axis of rotation,
said balancing device comprising:
   a fixed portion,
   a movable portion defining a central axis, said movable portion
     being constrained to said rotating piece so that said central axis substantially coincides with said rotation axis, and
     comprising at least one eccentric mass rotatable around said central axis and not balanced with respect to said central axis,
   movement means of said at least one eccentric mass, suitable to rotate said eccentric mass, with respect to said rotating piece around said central axis,
   wherein said movement means comprise a magnetic brake, and
   said eccentric mass comprises a peripheral portion, in non-ferromagnetic material with high conductivity, and a central portion, in ferromagnetic material,
   wherein said magnetic brake comprises at least a conductive portion, made of conductive material, and at least one magnetic portion suitable for creating a magnetic field acting on said eccentric mass,
   wherein said magnetic portion comprises adjustment means of the distance between said magnet electromagnet and said conductive portion.

14. The balancing device according to claim 13, wherein said adjustment means comprise an electric motor.

15. A balancing device for a rotating piece,
said rotating piece defining an axis of rotation,
said balancing device comprising:
   a fixed portion,
   a movable portion defining a central axis, said movable portion
     being constrained to said rotating piece so that said central axis substantially coincides with said rotation axis, and
     comprising at least one eccentric mass rotatable around said central axis and not balanced with respect to said central axis,
   movement means of said at least one eccentric mass, suitable to rotate said eccentric mass, with respect to said rotating piece around said central axis,
   wherein said movement means comprise a magnetic brake, and
   said eccentric mass comprises a peripheral portion, in non-ferromagnetic material with high conductivity, and a central portion, in ferromagnetic material,
   wherein said peripheral portion has a thickness comprised between 0.5% and 5% of the diameter of said eccentric mass.

\* \* \* \* \*